July 25, 1961  D. GOLD  2,993,668
GUIDABLE PARACHUTE
Filed July 13, 1959  2 Sheets-Sheet 1

INVENTOR.
DAVID GOLD
BY
ATTORNEYS

July 25, 1961  D. GOLD  2,993,668
GUIDABLE PARACHUTE
Filed July 13, 1959  2 Sheets—Sheet 2

INVENTOR.
DAVID GOLD
BY
ATTORNEYS

Patented July 25, 1961

2,993,668
GUIDABLE PARACHUTE
David Gold, 10007 Pali Ave., Tujunga, Calif.
Filed July 13, 1959, Ser. No. 826,885
1 Claim. (Cl. 244—142)
(Granted under Title 35, U.S. Code (1952), sec. 266)

The invention described herein may be manufactured and used by or for the United States Government for governmental purposes without payment to me of any royalty thereon.

This invention relates generally to improvements in parachutes and, as illustrated herein, relates more particularly to an improved guidable parachute.

In recent years, the use of the extended skirt type parachute has increased due to its stability and desirable opening characteristics. However, the extended skirt type parachute, when used for man-carrying purposes, has proven extremely hard to maneuver. This is due to the fact that the feature which gives it its stability and desirable opening characteristics—the extended skirt—also makes it difficult to guide. The extreme cupped configuration of this canopy makes air spillage by the jumper extremely difficult. The only means of guiding a parachute generally is by spillage of air by the jumper as he manipulates the parachute's suspension lines. This action is generally called "slipping" a parachute.

One object of the present invention is to provide an improved design extended skirt parachute which will possess an inherent glide, and which can be guided to the jumper's right or left at his will. This is accomplished by providing a specially calculated orifice in the side of the canopy which forms an exit for the trapped air in the inflated canopy to rush out. The result of this is to set up a side drift or gliding action in the parachute as it descends.

The foremost object of the present invention is to provide a system for calculating the design of the orifice so that a maximum of side thrust is obtained without endangering the opening characteristics and/or other desirable features of the extended skirt type parachute.

Other objects of the present invention are to improve generally upon the construction and operation of parachutes.

With the above and other objects and features in view, the invention will now be described with particular reference to the accompanying drawings which illustrate a preferred embodiment of the invention and in which.

Figures 1, 2:
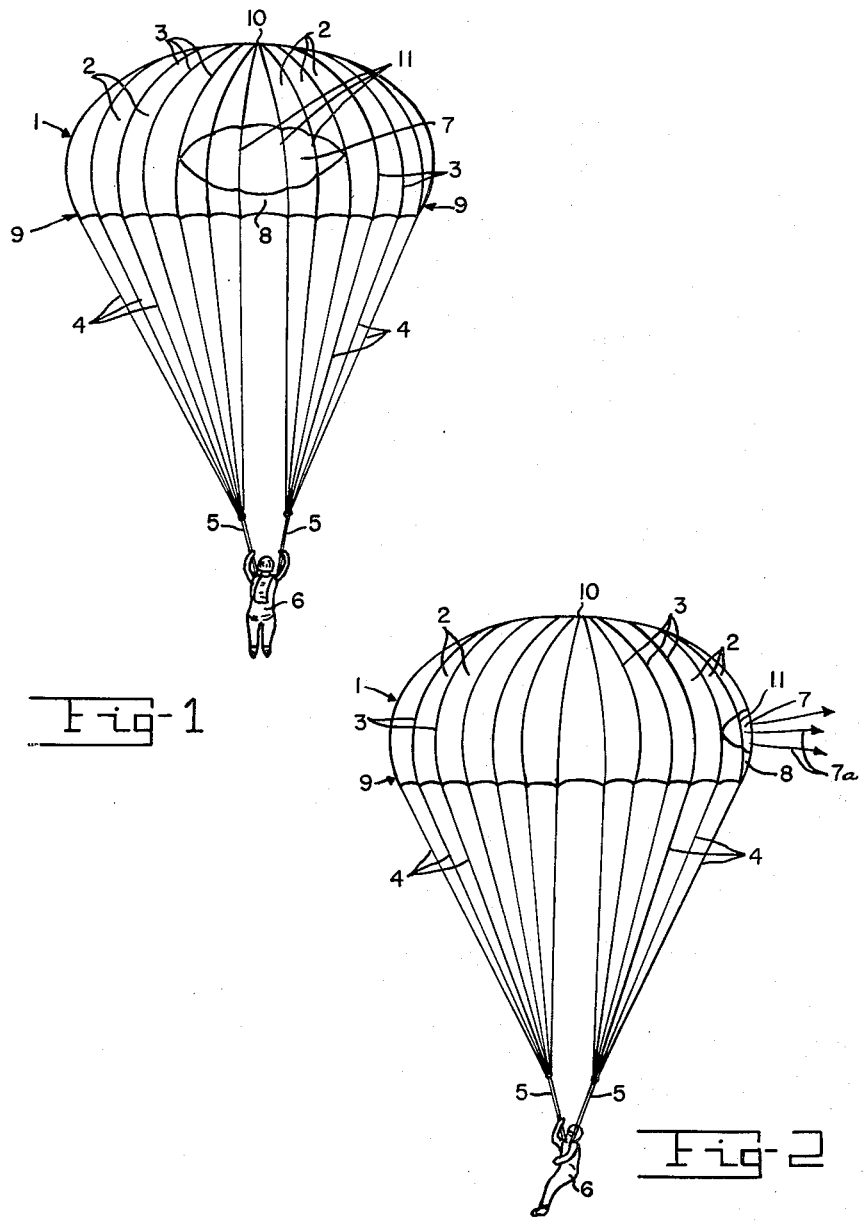
FIG. 1 is a view of the inflated parachute from the rear illustrating the parachute's canopy with its specially designed orifice in accordance with the present invention.
FIG. 2 is a view of the inflated parachute from the side illustrating the parachute's canopy with its specially designed orifice in accordance with the present invention.

Referring now more particularly to the drawings, in FIGS. 1 and 2 the present invention consists of an extended skirt parachute canopy 1, which is comprised of a system of gores 2, seams 3, and suspension lines 4, all assembled in the manner well known to all cognizant of the parachute art. The suspension lines 4 are attached to a set of risers 5 which are connected to the harness worn by the parachutist 6. The canopy is provided with an elongated orifice 7 which is so designed that it is located on that portion of the inflated canopy which is the most nearly vertical. This longitudinal orifice 7 is also designed so that it extends across a number of adjacent gores 2 in such a manner that it provides a solid strip 8 across the skirt portion 9 of the canopy 1. By thus designing the orifice so that it requires removal of fabric that is most near vertical in the inflated parachute canopy and which at the same time does not sever the continuity of the skirt, it is possible to obtain a maximum of horizontal thrust to the canopy without inviting malfunctions, as is the case with other types of parachutes designed for guidability. Added safety results from the fact that no fabric is removed from the apex area 10 of the canopy 1, which permits the desired pressure build-up in this area 10 during the filling phase of the deployment or opening process.

In order to maintain the shape of the orifice 7 and retain strength of the canopy 1, the lines or reinforcement tapes 11 which channel through the seams 3 are permitted to extend across the orifice 7. As shown, these reinforcements 11 are across the mouth of the orifice and are secured with sewing at points where they enter the edge of the orifice 7 and continue through their respective seams 3. The dimensions of these reinforcing tapes or lines 11 are determined as part of the calculations presented later in this description.

Referring to FIG. 2, we see a view of the present invention as seen from the side. The orifice 7 is placed to the rear of the parachutist 6 in the side view. Most jumpers prefer this arrangement, as the inherent glide of the parachute will therefore be forward through the air mass. Arrows 7ª indicate the direction of airflow out of the orifice 7, the jetting action of which gives the parachute its forward gliding action horizontally as it descends. Guiding or turning the parachute is accomplished by manipulation of the risers 5 by the parachutist 6. A standard four riser system, two risers each from each shoulder of the jumper, is preferably employed. In the present invention a turn is accomplished in a desired direction by pulling in an appropriate riser. Pulling in on either rear riser distorts the canopy 1 in such a manner that the orifice 7 is pulled out of alignment; this deflects the jetting air from the orifice 7 in a sideways pattern which causes the parachute to rotate or turn. Thus, a turn to the right is accomplished by pulling in the right rear riser, and a turn to the left is accomplished by pulling in the left rear riser. Turns are also possible by manipulation of the front risers. However, such turns are not executed as rapidly, as the turning action of the parachute results in this case from a change in frontal area as the parachute glides, instead of a change in the direction of airflow through the orifice 7.

Figure 4:
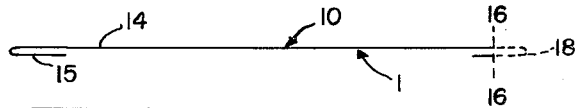
FIG. 4 is a section of the canopy as shown in FIG. 3 taken about on line 4—4 in FIG. 3.
Figure 3:
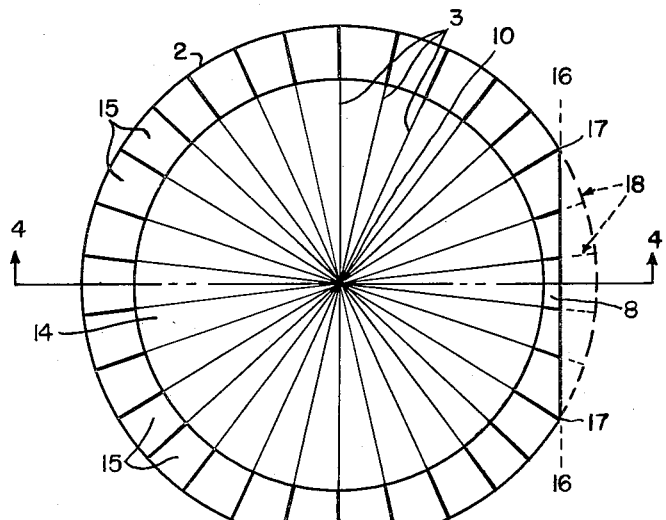
FIG. 3 is a somewhat schematic sectional side (and bottom plan view) of the uninflated parachute canopy as it would appear when laid down on a flat surface, in order to illustrate the basic theory and practice in arriving at the design of the orifice.

Referring now to FIG. 3, the theory for the design of the orifice 7 is illustrated. It is again stressed that the present invention depends on the proper location of the elongated orifice 7 for its maximum performance. The suspension lines have been eliminated in FIG. 3 for clarity purposes. Illustrated, as used in the present invention, is the flat type of extended skirt parachute canopy 1. The theory and practiced method of calculating the orifice given herein may be applied to other types of extended skirt parachutes. A side sectional view on line 4—4 of FIG. 3 is illustrated in FIG. 4 and bottom plan view is illustrated in FIG. 3. These views schematically represent the uninflated canopy 1 laid out as shown as on a flat surface. When thus placed, the upper portion of the gores 14 and the extended skirt portion of the gores assume relative positions as shown. It can now be seen that if an imaginary cut were accomplished along line 16—16 in FIGS. 3 and 4, a segment of the outmost portion of the flattened canopy 1 would be sheared off. It should be kept in mind that the outmost portion—the peripheral portion—of the flattened uninflated canopy assumes a near vertical position when the canopy is inflated. For fabrication reasons and strength considerations, this cut is made from a junction point 17 on the seams 3. The dotted lines 18 indicate that portion of the canopy which is removed and which thereafter forms the elongated orifice 7 in the canopy when the canopy becomes inflated as shown in FIGS. 1 and 2. The points 17 selected must be so chosen as to leave an orifice large enough to give the desired outward airflow, but sufficiently small to insure that it is spaced materially above the lower edge of the skirt portion, leaving a strip 8 in the skirt 9 in order to maintain an unbroken skirt configuration. Broken skirt or uneven skirt configurations, it is well known to those in the parachute art, lead to malfunctions and abnormal openings. It is possible within the scope of the theory and practice outlined here to produce an extremely large orifice—and still maintain a strip 8 on the skirt—by plotting or drawing two imaginary cutting lines 16 at an angle to each other.

Figure 5:
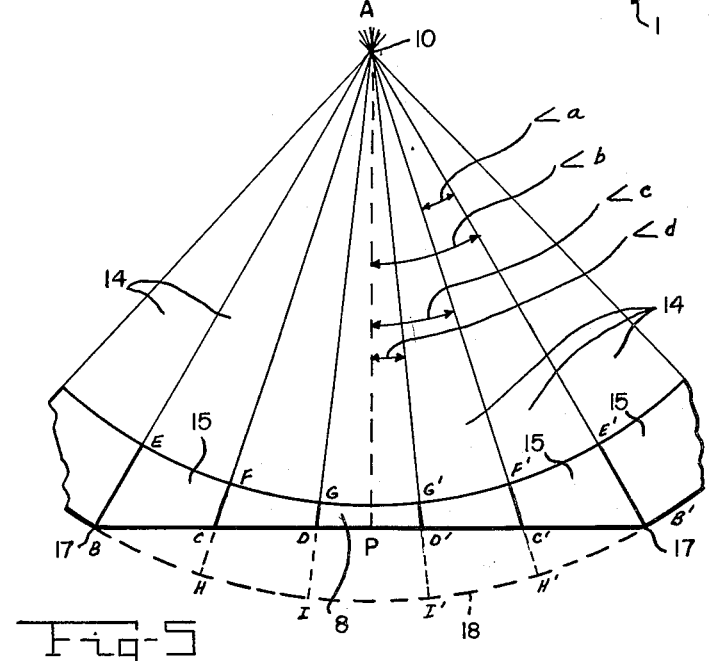
FIG. 5 is a notated diagram of the vented portion of the canopy which will be utilized to demonstrate the calculation method used to properly design the orifice utilized in the canopy of the present invention.

Referring next to FIG. 5, a notated diagram is shown which will be used to describe the method of calculating the orifice and other needed dimensions.

The parachute designer, in his original layout of the parachute gores, determines angle $a$, and dimensions $AB$, $EF$, $EB$, and $BH$. These dimensions are determined initially for the gore's dimensions, and they are functions of the desired size (nominal diameter) of the parachute that is being designed. These original dimensions are:

Angle $a$—based on the number of desired gores $AB$=length of upper portion of gore
$BE$=length of extension portion of gore
$EF$=width of skirt hem portion of gore
$BH$=width of gore at widest point, (juncture of upper gore and extension portion of gore)

Note that $AB$ equals $AH$, etc.; that $EB$ equals $FH$, etc.; that $BH$ equals $HI$, etc.; that is to say, that all gores are identical and congruent. We construct line $BB'$.

Knowing the above dimensions for the reasons already pointed out, the required additional dimensions are calculated as follows:

$$\angle d = \angle a + 2$$
$$\angle c = \angle a + \angle d$$
$$\angle b = 2\angle a + \angle d$$

If an odd number of gores are included in the orifice, a perpendicular bisector $AP$ is required.

$$AP = \cos b \cdot AB$$

Therefore, $$AC = AP + \cos c$$
$$AD = AP + \cos d$$

Likewise, $$BP = AP \cdot \tan b$$
$$CP = AP \cdot \tan c$$
$$DP = AP \cdot \tan d$$

The dimensions $BC$, $CD$, $DD'$ are gotten as follows:

$$BC = BP - CP$$
$$CD = CP - DP$$

Likewise, $AE = AF = AG = AB$ minus $BE$
$BE = FH = GI$, and $CH = AB$ minus $AC$
$FC = BE - CH$
$DI = AB - AD$
$GD = BE - DI$ Thus, all of the necessary dimensions required for plotting the gores and the orifice have been determined.

The length of the reinforcement line or tape 11 is determined by doubling the dimensions $CH$ and $DI$.

It is understood that these dimensions are centerline dimensions, and they have to be integrated into the patterns with allowances for seams and hems in the manner which is familiar to those in the parachute art.

It is obvious that the intent and scope of this invention is based on the proven idea and theory of eliminating the near vertical material for forming the orifice 7 and at the same time maintaining the skirt continuity along the bottom of the longitudinal orifice 7. Altering the design method by introducing small angles or arcs in no way alters the concept presented here in this invention. The system of straight lines used here was found to be the simplest and most expedient.

I claim:

In a steerable glide propulsion parachute comprising a substantially hemispherical canopy, having a vertical descent axis, and an annular extended skirt portion converging inwardly and downwardly from the canopy, said canopy and extended skirt portion comprising a plurality of radial gores secured together to form seams at their opposite edges around the canopy, a vertical plane passing through said vertical descent axis, a group of load suspension lines extending along said seams and converging downwardly from points located on said seams at the lower edge of the extended skirt portion to two load suspension points spaced on opposite sides of said vertical plane, said load suspension points being adapted to carry the conventional spaced risers of a conventional parachute harness, one riser being adapted to be connected to one side of the parachute harness and the other riser being adapted to be connected to the other side of the parachute harness, said hemispherical canopy and its inwardly and downwardly extending skirt portion having an elongated oval shaped vent opening formed therein, said vent opening extending from said vertical plane in opposite directions around the periphery of the parachute past an equal number of load suspension lines at opposite sides of the aforesaid vertical plane, the upper and lower edges of said vent opening being spaced equidistant from and on opposite sides of the juncture of said hemispherical canopy with its extended skirt portion to dispose the plane of said vent opening substantially parallel to the aforesaid vertical axis, said oval vent opening having a major axis, the opposite ends of said major axis being disposed on the juncture of said hemispherical canopy with its extended skirt portion, the lower edge of said vent opening being disposed in said downwardly and inwardly converging extended skirt portion materially above the lower edge of said extended skirt portion, whereby during descent air leaves the canopy through said oval shaped opening in a direction perpendicular to said descent axis and greater pull on one of said risers distorts said elongated oval shaped opening in one direction to direct a greater portion of the air therefrom to one side of the aforesaid vertical plane and greater pull on the other riser distorts the elongated oval shaped opening in the opposite direction to discharge the greater portion of the air therethrough from the inside of the canopy in the aforesaid transverse plane to the descent axis of the canopy, at the opposite side of the aforesaid vertical plane.

References Cited in the file of this patent

UNITED STATES PATENTS

| | | |
|---|---|---|
| 2,458,264 | Hart | Jan. 4, 1949 |
| 2,581,808 | Moran | Jan. 8, 1952 |
| 2,746,699 | Hart | May 22, 1956 |